United States Patent [19]

Straka et al.

[11] Patent Number: 4,698,228

[45] Date of Patent: Oct. 6, 1987

[54] PROCESS FOR EXTRUDING DOUGH AS USED IN PRODUCING CRISP BREADS

[75] Inventors: Robert Straka, Pequannock; Edgar Ross, Wayne; Fred Vanderveer, Mahwah, all of N.J.

[73] Assignee: Nabisco Brands, Parsippany, N.J.

[21] Appl. No.: 798,419

[22] Filed: Nov. 15, 1985

Related U.S. Application Data

[62] Division of Ser. No. 594,159, Mar. 29, 1984, Pat. No. 4,659,303.

[51] Int. Cl.⁴ ............................................. A21D 13/00
[52] U.S. Cl. .................................... 426/446; 426/448; 426/516
[58] Field of Search ............... 426/446, 448, 449, 450, 426/514, 516, 517; 425/376 R, 380, 381, 461, 464, 465, 466, 470, 377

[56] References Cited

U.S. PATENT DOCUMENTS

| Re. 30,221 | 2/1980 | Moreno | 425/190 |
|---|---|---|---|
| 2,068,220 | 1/1937 | Baechi | 366/87 |
| 2,148,003 | 2/1939 | Wurtzel | 425/464 |
| 2,261,977 | 11/1941 | Deutsch | 425/191 |
| 2,740,157 | 4/1956 | McCurdy et al. | 425/327 |
| 3,752,614 | 8/1973 | Bremer | 425/466 |
| 3,897,528 | 7/1975 | Suh | 264/51 |
| 3,914,085 | 10/1975 | Kruelskie | 425/380 |
| 4,146,563 | 3/1979 | Ratafia et al. | 264/51 |
| 4,150,929 | 4/1979 | Brandt | 425/380 |
| 4,217,083 | 8/1980 | Machuque | 425/376 R |
| 4,292,019 | 9/1981 | Hay et al. | 425/325 |
| 4,361,530 | 11/1982 | Peer | 425/461 |

FOREIGN PATENT DOCUMENTS

| 157722 | 7/1903 | Fed. Rep. of Germany . |
| 2546583 | 4/1977 | Fed. Rep. of Germany . |
| 788133 | 12/1957 | United Kingdom . |

OTHER PUBLICATIONS

"Extruded Crispbread Fast Mover in Europe", *Snack Food*, Oct., 1982, pp. 28 and 30.

Primary Examiner—George Yeung
Attorney, Agent, or Firm—Richard Kornutik

[57] ABSTRACT

A dough guide is used to precisely control thickness of an expanding dough extrudate. The extrudate is forced through at least two vertical slots in an extrusion head, at relatively high pressure and at a temperature at least equal to the boiling temperature of water.

The dough guide has three plates. A middle plate is fixed between the slots. Two movable plates are disposed on opposite sides of each slot from the middle plate. A threaded rod is used to selectively adjust the location of each of the movable plates. In alternative embodiments, any number of slots are used, each having two guides adjacent it. Any or all of the guides may be made selectively movable. A product called "crisp bread" may be made thereby.

7 Claims, 9 Drawing Figures

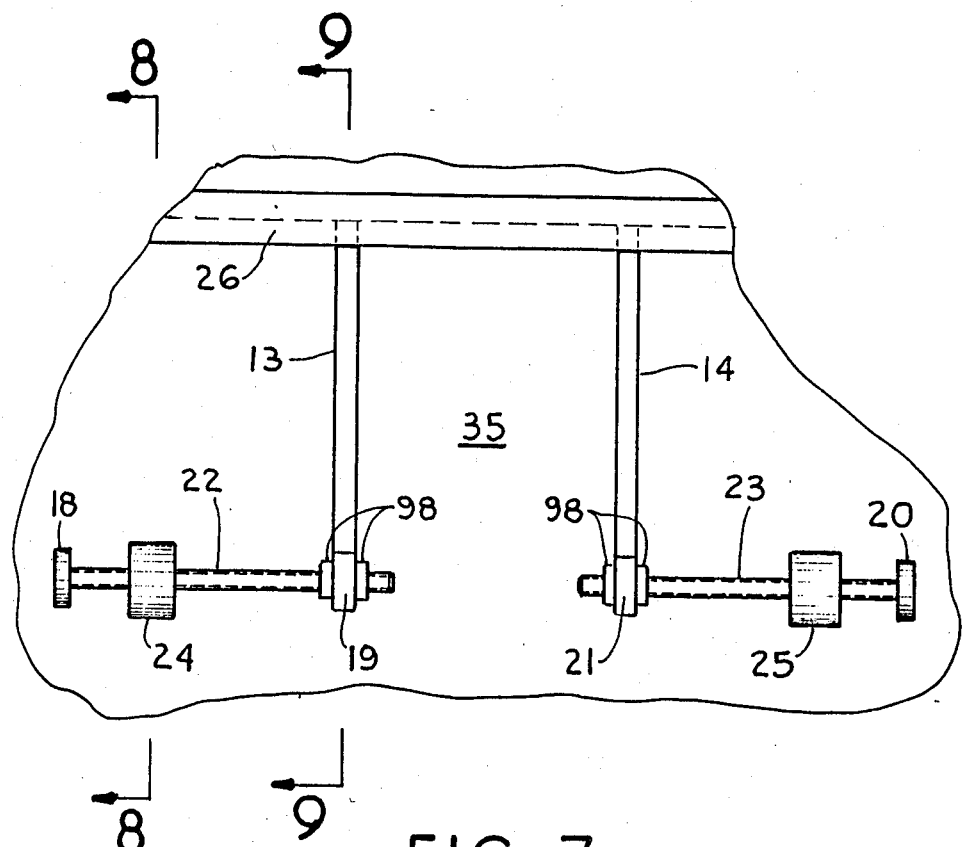
FIG. 7
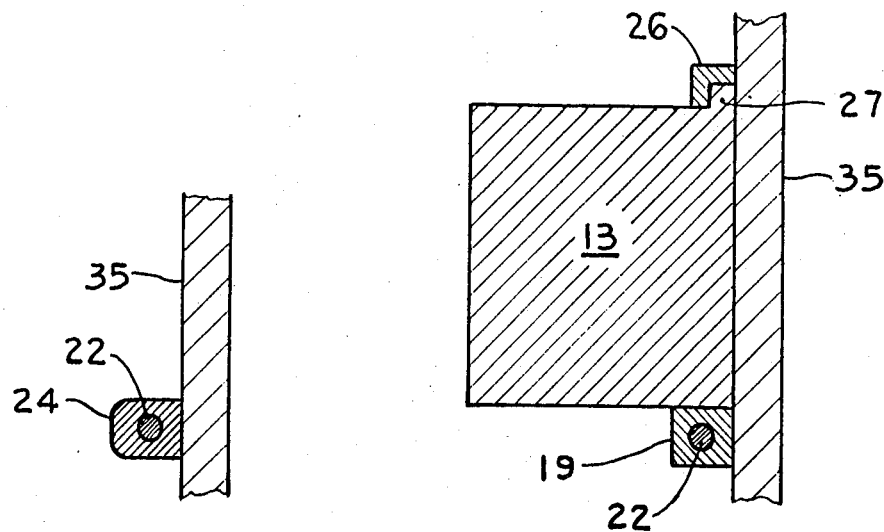
FIG. 8
FIG. 9

PROCESS FOR EXTRUDING DOUGH AS USED IN PRODUCING CRISP BREADS

This is a divisional of application Ser. No. 594,159, filed Mar. 29, 1984, U.S. Pat. No. 4,659,303.

BACKGROUND OF THE INVENTION

1. Field of The Invention

The present invention relates to a process and apparatus for extruding dough, particularly for yeast dough, crisp breads and puffed breakfast cereals.

The present invention also relates to an extruder die head and more particularly, to dough guides fastened to the die head.

2. Description of The Prior Art

Extruders currently used for processing yeast dough, crisp breads and puffed breakfast cereals are known and generally comprise one or more feed hoppers which regulate the dry ingredients fed into a twin screw cooker/extruder where water is directly added to the dry ingredients by means of a metering pump.

U.S. Pat. No. 4,217,083 discloses a complete baking-extrusion-expansion process as shown in FIG. 1, with the extrusion head being the novelty of the invention. The extrusion head has a horizontal slot from which dough is extruded onto two pivotable bars. Also, note straps 22 of FIG. 6.

The article entitled "EXTRUDED CRISP BREAD FAST MOVER IN EUROPE", published in the magazine Snack Food Oct. 19, 1982, discusses a twin screw cooker-extruder in which dough is extruded horizontally and passed onto a gauge roll which feeds to the cutter.

Because texture and shape are highly important in the manufacturing of food, and particularly for dough products, it is particularly important to maintain rigid controls upon the final end product. The prior art apparatus and process fail to provide a final dough product that is uniform in thickness (shape). Sporadic surging of dough from the die head and extreme expansion of dough are not corrected by prior art processes and apparatus. Thus, from time to time, a product like crisp breads, for example, it non-uniform in thickness and in degree of expansion.

Moreover, because the prior art extrudes the dough from a horizontal die slot, and then immediately deposits the dough on a conveyor belt, the texture of the dough is non-uniform. The upper surface of the dough is generally more cellular and lighter in color than the bottom surface which contacts the conveyor belt. Also, the texture is non-uniform because occluded gases within the dough are much hotter than ambient gases and thus tend to rise. The upper horizontal surface of the extruded dough easily allows the gases to evaporate from the dough, thus forming a textured cellular surface. However, the lower horizontal surface of the extruded dough often times does not have the same texture as the upper horizontal surface. This is due to the fact that the occluded gases near the loewr horizontal surface of the extruded dough attempt to escape from the dough by rising from the lower horizontal side of the dough to the upper horizontal surface. Some occluded gases do, of course, escape from the lower horizontal surface of the extruded dough.

When the occluded gas escapes from the extruded dough, a cellular texture product results. The cellular texture disperses the light impinging on the final product causing a lighter color as compared to a surface which is non-cellular or in which the cellular formation is not uniform. Therefore, the prior art baked dough does not have a consistent uniform color from side to side.

Neither aforementioned Snack Food the article nor U.S. Pat. No. 4,217,083 disclose an extruder with an attached dough guide for preventing the expanding dough issuing from the extruder from being too irregular, nor do they disclose a vertically oriented die to produce a more uniformly textured product.

Often it is particularly desirable to vary the width of the dough guide to provide different degrees of guidance of the extruded dough and thus produce products of varying sizes by merely employing different sized dies and adjusting the dough guide to accommodate the die.

SUMMARY OF THE INVENTION

The present invention provides a process for producing crisp breads having a substantially uniform texture on its major horizontal surfaces. The baked products also have a substantially uniform color and appearance.

The dough is mixed in an extruder and ejected through a die head with at least one vertical die slot. The vertically oriented die slot allows the occluded gases to escape more uniformly thus yielding a more uniform texture. The die head includes an attached dough guide employed to prevent the dough from expanding excessively, which would result in an oversized product. Moreover, the dough guide is readily adjustable generally independently of the extrusion process. To prevent sticking, the dough guide and die slot can be provided with a non-stick coating such as Teflon ®.

It is well-known that excessive heat during the extruding process detrimentally affects the extruded dough and can cause the dough to be overcooked and cause jam-ups which would affect dough texture and quality. In order to reduce the possibility of dough jamming at the die slot and having the dough become overcooked, the use of the dough guide of the present invention increases the thermodynamic characteristics of the die itself, allowing the die to operate at a cooler temperature while the extruder maintains the necessary higher temperature to achieve the proper baking of the dough.

BRIEF DESCRIPTION OF THE DRAWINGS

FIG. 7 shows a front view of a particular embodiment of a support structure for the movable plates.

FIG. 8 is a section of the support taken along line 8—8 of FIG. 7.

FIG. 9 is a section of the movable plate and guide slot taken along line 9—9 of FIG. 7.

DESCRIPTION OF THE PREFERRED EMBODIMENTS

Figure 1:
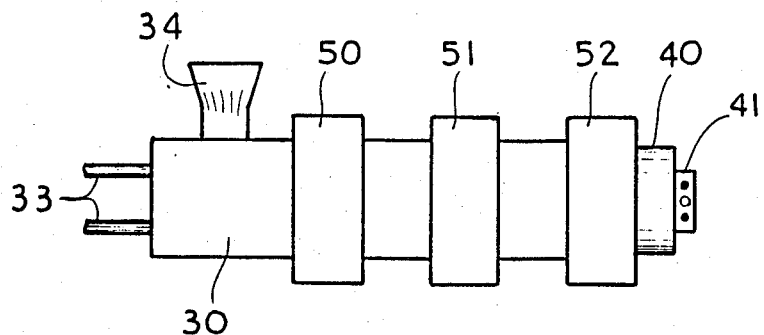
FIG. 1 shows a side view of the extruder with the die head and dough guide.

FIG. 1 shows a typical baking-extrusion-expansion apparatus for the processing of yeast dough, puffed breakfast cereals, and crisp breads. The process is accomplished with an extruder 30 which has a communicating hopper 34 at one end of the extruder, with a die head 35 generally at the opposite end of the extruder. The extruder can be of the single or twin auger type which are well-known in the art. A conventional twin-screw food extrusion system, for example, is the Baker Perkins MPF-50D. The pitch of the auger generally decreases from the hopper to the die head so as to gradually increase the pressure on the dough product to be extruded. Extruder pressures generally run in the range of 1000-3000 psi. The extruder generally includes a cooker which, for example, could encompass a steam jacket surrounding the extruder. Also, a metering pump for measuring a predetermined amount of water or other liquids is generally associated with the extruder. The complete system, therefore, can mix the dry goods from the hopper until a uniform composition results. Then the proper amount of water is added to insure uniform hydration of the dough by means of the twin augers. By this time, the dough has been transported to the cooking area of the extruder. This area is surrounded by a steam jacket which cooks the dough as it is transported to the die head. The dough is extruded from the die head where it expands, cools, and is cut. Generally, mixing the dry goods takes about 5–15 minutes. Mixing in the extruder barrel takes about 30 seconds before the cooking stage. The addition of the water and the further mixing to uniformly hydrate the dough takes about 30 seconds. Cooking time is generally in the range of 15 seconds to 2 minutes and the temperature is in a range of 160° F. at the beginning zone to about 320° F. at the exit. Cooling time before cutting is generally in the range of 3–10 seconds. The extrudate should be cooled sufficiently so it doesn't crimp during cutting, yet if too cool it will be brittle and will fracture or crumble during cutting.

In order to prevent the dough from adhering to the side walls, the twin augers, and die head slots, a coating of a non-stick material such as Teflon ® can be employed.

Teflon ® coated surfaces allow the surfaces to be cleaned more easily and makes a visible inspection of the die orifices much easier when one attempts to determine the degree of wear of the die. An inspector would know the die orifice is wearing thin if he were to see the Teflon ® coating being worn to the point that the underlying metal shows. Also, the use of a Teflon ® die yields a product that is more uniform in shape than would be achieved otherwise because the dough does not stick to the Teflon ® surface and thus can be extruded in a clean fashion.

Once the dough is extruded and guided from the cooker-extruder, it is oriented horizontally by rollers, placed upon an open mesh conveyer belt, and cut by means of a wire cutter, a guillotine cutter, a disc-shaped knife cutter, or by any other suitable means.

The die head employed at the end of the extruder can be made with one or more vertically oriented rectangular slots. Generally bronze or stainless steel is employed in the manufacturing of the die head. A bronze die head has better heat transfer characteristics than a stainless steel die head, dissipating heat much more rapidly than the latter. Such a feature helps control the degree of baking of the dough within the cooker-extruder. The die slots can be of the replaceable type, thus avoiding replacement of the entire die head when the die slots are worn. Also, varying die slot sizes can be readily obtained by replacement of the die slots.

Figure 2:
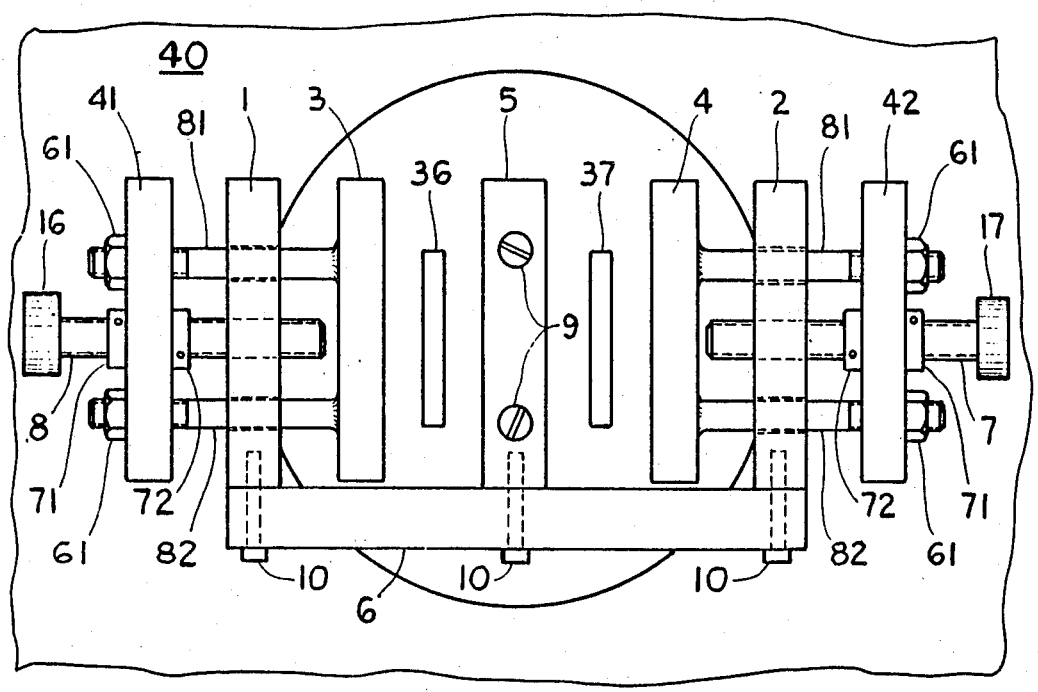
FIG. 2 shows a front view of the dough guide attached to a die head.

FIG. 2 shows the dough guide of the present invention, which is fastened to die head 35 as shown in FIG. 1 by means of screws or bolts 9. The dough guide comprises a bar 6 which is attached to walls 1, 2, and 5, which extend perpendicularly to the die head and are positioned on the die head by placing the wall 5 between the two die slits 36, 37. The lower edges of the walls 1 and 2 each contain a pair of holes which are internally threaded to accommodate the shafts of screws 10. Screws 10 attach plate 6 to plates 1, 2, and 5, respectively. The outer walls 1, 2 each have three transverse bores therethrough. The central bore of each of walls 1, 2 is threaded to threadingly receive respective threaded shafts 7, 8. A pair of upper guide shafts 81, 81 pass through the upper bores in respective walls 1, 2. A pair of lower guide shafts 82, 82 pass through the lower bores in respective walls 1, 2. Each upper shaft is welded at one end thereof to a respective one of movable plates 3, 4.

A plate 41 is retained by nuts 61, 61, and shafts 81, 82, and 8. The plate 41 is fixedly attached (as by internal threading, and bias against nuts 61, 61, or welding, or the like) to shafts 81, 82. The shaft 8 is not fixed to plate 41, and thus may rotate therein. A pair of locknuts 71, 72 is fixed to the shaft 8 so that rotation of shaft 8 by the knob 16 advances the plate 41 either toward or away from wall 1, due to threaded engagement of shaft 8 with the bore in wall 1. Shaft 7, in threaded engagement with wall 2, is similar in construction and operation to that described above for shaft 8 and wall 1.

As discussed hereinabove, the screw mechanism attached to plates 3, 4 permits separate adjustment of the location of each of plates 3, 4 by manual rotation of knobs 16, 17 respectively. This allows an operator to position plates 3 and 4 such that size of the extruded product can be critically maintained and controlled. The dough guides 1, 2 which are equipped with the shafts 81 and 82 can be calibrated in a manner to indicate the particular thickness desired for the extruded product. The knobs 16, 17 would indicate the calibrated thickness, by matching a mark on each of knobs 16, 17 with appropriate reference marks located adjacent the knobs 16, 17.

Figure 3:
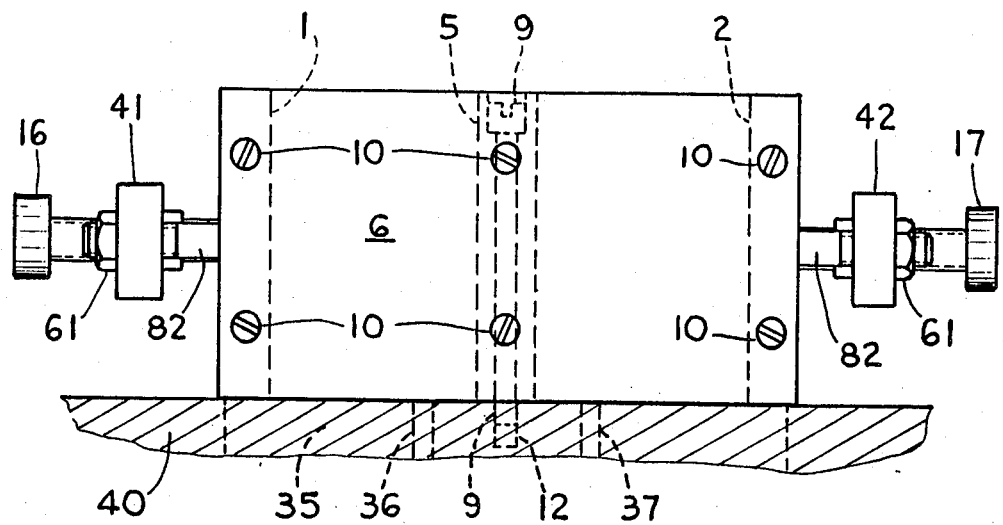
FIG. 3 shows a bottom view of the dough guide attached to a die head.

FIG. 3 shows an underneath plan view of the dough guide of FIG. 2 further illustrating how the dough guide is attached to the die head 35. Die slits 36, 37 are shown in dotted outline in FIG. 3. The six screws, each numbered as 10, are shown in FIG. 3. Two screws 10 retain each of plates 1, 2, 5 to the plate 6. The lower bolt 9 is shown in FIG. 3 in dotted outline received in bore (unnumbered) through the plate 5, the bolt 9 being threaded. A threaded bore 12 is also shown in dotted outline, the bolt 9 being threadedly received in the threaded bore 12. The bolts 9,9 together fixedly attach the dough guide assembly of the present invention to the die head 35.

In operation, dough is extruded under pressure through the slits 36, 37 in die head 35. The dough expands immediately since the ambient pressure is greatly reduced relative to pressure in the extruder 30, and this reduction in pressure causes vaporization of water and expansion of steam, thereby making the product light in weight relative to its enlarged volume. The movable plates 3, 4, together with the fixed wall 5, serve to limit expansion of the dough and to control the shape of the subsequent extruded dough product into a plate-like shape of controlled, uniform thickness. Due to a variety of conditions, including internal dough temperature and composition, die slit size, desired product thickness, ambient air pressure, and extruder pressure among other variable conditions, it is desirable to vary the spacing of plates 3, 4 from wall 5, so as to control the product thickness precisely.

Figure 4:
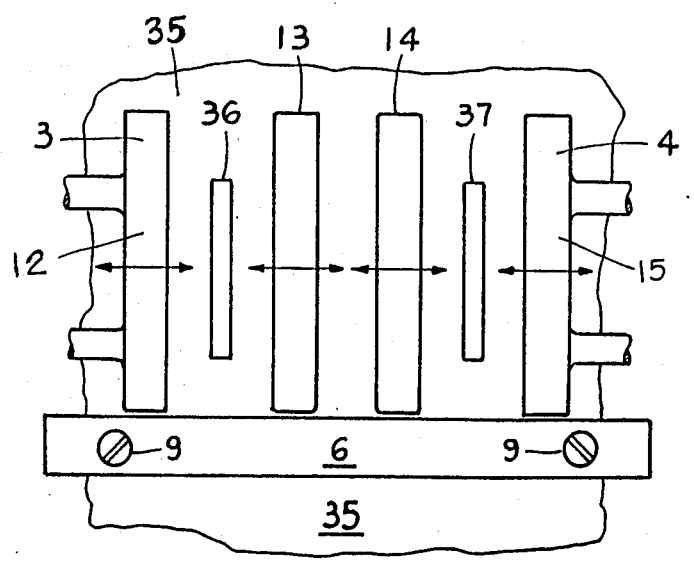
FIG. 4 shows a front view of a different embodiment of the dough guide.
Figure 5:
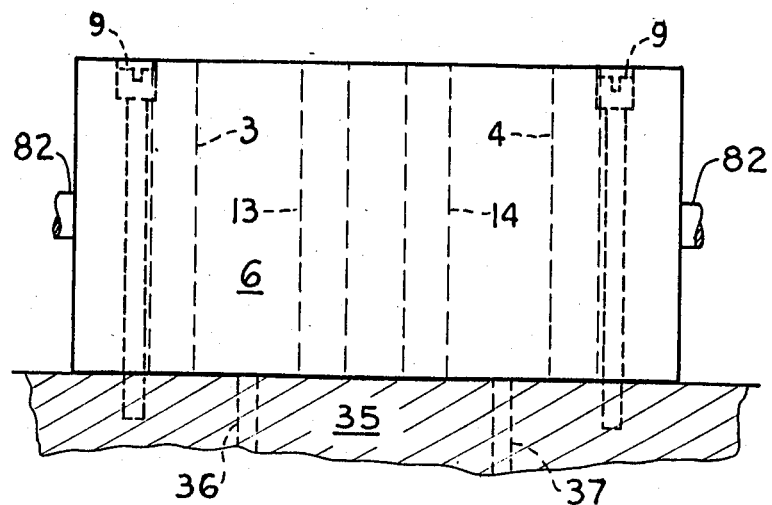
FIG. 5 shows a bottom view of the dough guide of FIG. 4.

FIGS. 4 and 5 show a further embodiment of the present invention wherein a plate 6 is attached to the die head 35 by screws 99, and further having walls 12, 13, 14, and 15 which are movably positioned with respect to plate 6 and die orifices 36, 37. Walls 12 and 13 are positioned on each side of one of the die slots, while walls 14 and 15 are placed on each side of the other die slot. All the walls are capable of movement with respect to the die slots. This allows the same control of the extruded dough as the dough guide shown in FIGS. 2 and 3. Plates 3, 4 are adjustable as shown in FIGS. 2, 3.

It would not be necessary for all walls to be movably adjustable. Of the pair of walls surrounding each of the orifices, one wall could be stationary, while the other is movably adjustable. For example, walls 12 and 15 could be stationary while walls 13 and 14 are movable. On the other hand, walls 12 and 15 could be movable while walls 13 and 14 are stationary. If both walls 13 and 14 are stationary, it would be desirable to eliminate one of the walls. This yields a dough guide similar in structure to that shown in FIGS. 2 and 3, except that all walls may be movable and thus the plates 3 and 4 and screws 7 and 8 are eliminated. Any types of supports can be used to adjustably position the plates 12-15, for example the outer plates 1, 2 of FIG. 2 could be used as discussed above to move plates 12, 15, while the plates 13, 14 can be moved by an known support means, or in a preferred embodiment by the guide slot and screw support shown in FIGS. 7-9.

Figure 6:
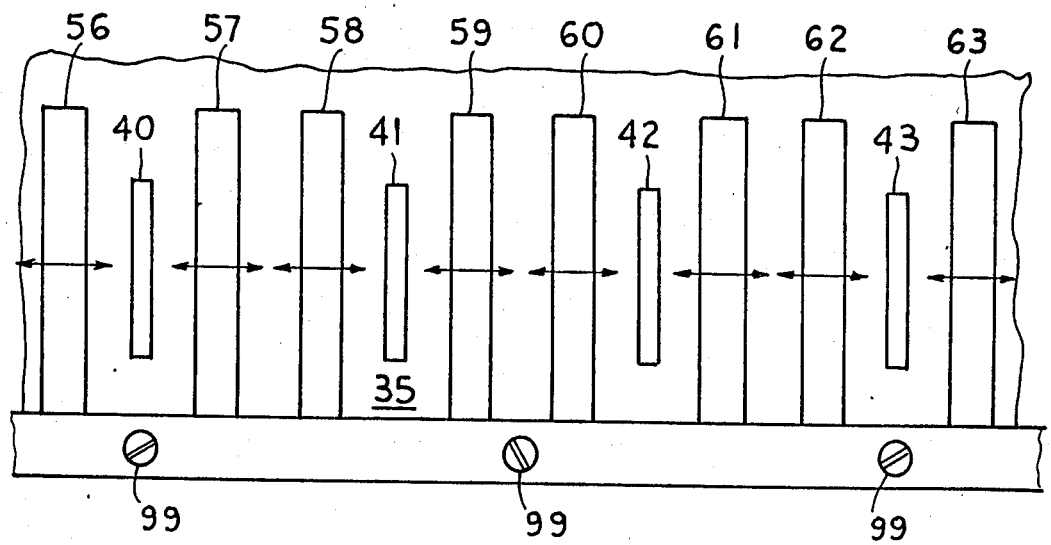
FIG. 6 shows a front view of another embodiment of the dough guide which is similar to that shown in FIG. 4 but which accommodates a four-slotted die head.

FIG. 6 shows yet another embodiment of the present invention. The dough guide of FIG. 6 is similar to the dough guide of FIGS. 4 and 5 but is for use with a die head that has four die slots 40, 41, 42, and 43. The walls 56, 57, 58, 59, 60, 61, 62, and 63 are each movably positioned just as the walls of FIGS. 4 and 5 are, to allow an operator to control the extruded product issuing from the die slots. Walls 56, 63 of FIG. 6 may be positionable by use of the mechanism of FIGS. 2 and 3, described hereinabove.

All of the dough guides shown can be manufactured with a Teflon ® coating to prevent sticking of the dough to any of the walls or plates of the dough guide and to allow for easy cleaning. The dough guide can be made from metal such as copper, brass, stainless steel or from a hard plastic.

To prevent the die head from become too hot, which can affect the degree of cooking of the dough, and which can affect the viscosity and flow rate of the dough inasmuch as hot dough is more fluid and flexible, the dough guide of the present invention comprises walls (such as walls 1, 2, 5 in FIG. 2) which extend perpendicularly from the die head, and hence act as heat fins conducting the heat away from the die head. This yields a dough product which is more uniform in texture.

FIG. 7 is an enlarged, fragmentary front view of plate 6 of the dough guide shown in FIGS. 2 and 3, and shows a particular embodiment of the support structure for movable plates 13, 14. A guide slot member 26 is shown in dotted outline in FIG. 7. The member is fixedly attached to die head 35, as by welding, threaded fasteners, or the like. A top key 27 is also shown in dotted outline, this key 27 preventing tilting movement away from wall 6 of plate 13. A corresponding key (not shown) is provided on the plate 14. Bottom support lugs 19, 21 are securely fixed as by welding or the like to respective movable plates 13, 14, with each lug having a threaded hole therein for positioning by respective screws 22, 23. Similar lugs 24, 25 are fixed as by welding or the like to support plate 6, each having a smooth bore therein for passage of positioning screw threaded portions 22, 23, respectively. A locknut 98 is fixed to screw 22 on either side of plate 13. Similarily, locknuts 98 are fixed to screw 27. Thus, rotation of heads 18 or 20 causes movement of plates 13 or 14 respectively.

FIG. 8 is a side sectional view of the support lug 24 and support plate 6, taken along line 8—8 in FIG. 7. The lug 24 is similar to lug 25, and is affixed to plate 6 by welding, strong adhesive, threaded fasteners, or the like.

FIG. 9 is a side sectional view of plate 13 taken along line 9—9 in FIG. 7. The guide slot member 26 receives key 27 of plate 13, and prevents tipping of plate 13 away from plate 6 along the top edge. Lug 19 is shown formed integrally with the plate 13. Plate 14 is similarly constructed. A snug fit between the bores in respective portions 19, 21 and the respective screws 22, 23 prevents any significant rotational play about an axis transverse to the screw axis. This holds true during movement of the plates by operation of the respective screw heads 16, 20, as well.

Although a particular support embodiment is shown in FIGS. 7-9, any other support structure, providing for selectively adjustable movement of plates 13, 14, may be provided.

As can be seen from the dough guides described, an operator can alter the spacing of the plates to provide differing degrees of guidance of the extruded product to vary the size and limit the amount of expansion of the dough. Also, it is readily apparent that the walls or plates can be adjusted independently of the extrusion operation. Thus, there is no need to shut down the entire operation in order to adjust the degree of expansion of the dough extruded from the die head.

In operation, the dried products are fed into the extruder by means of hopper 34 and are thoroughly mixed to form a uniform composition. The addition of water through a metering pump, not shown, forms a dough when mixed and kneaded to the desired consistency. The dough is cooked and extruded through the die head 35 causing the dough to expand rapidly as it exits from the die orifice and continues to expand for a few seconds. Since the dough is still hot and flexible, the sudden expansion of the water vapor, as the excess pressure is released, increases the volume by several times. The water than vaporizes from the extruded dough. By vertically extruding the dough the two vertical sides have large surface areas, which allows the occluded gas bubbles near each surface to more easily escape their respective surfaces, thus achieving a more uniformly textured cellular product. In the case of horizontal extrusion, the bottom and top surfaces have a large surface area; however, due to the need to support the bottom surface, uneven escape of occluded gas bubbles occurs on the bottom surface relative to the top surface. With vertical extrusion, the left and right surfaces of the extruded product both have large surface areas that are approximately equally exposed to the environment and which therefore tend to allow even escape of occluded gas bubbles from both sides, for an even appearance. Also, the coloring of the extruded product is more uniform than that of the prior art because the cellular texture of the extruded product is more uniform.

The particular fat content of the flour employed in the extruder affects the expansion of the product. In general, as fat content increases, there is a tendency for a reduction in expansion, but the dough is more uniform and the surfaces are smoother, while cell size is smaller and more uniform. Rice flour, which has very little fat content, is easier to expand. Wheat flour which is more commonly employed in dough products, needs higher moisture and a higher temperature (primarily because of the higher fat content) to expand.

Other dough improvers can be added to the extruder during the kneading process of the dough in the auger. Improvers such as benzoyl peroxide can be used to bleach flour. Oxidizing agents can be employed to help ferment the dough more uniformly. Enzymes, vitamins, minerals, and mold inhibitors can also be added to the extruder. Such improvers are well-known to those skilled in the art.

It is important that the extruder maintain a proper pressure, moisture content and temperature when extruding the product such that the occluded gases within the dough upon expansion produce a uniform thickness product.

The particular pitch of the twin screw auger employed in the extruder and the particular rotational speed is important in determining the completeness of the mixing of the products, the proper amount of kneading of the dough, and the rate the dough is extruded through the die head. Typically, the twin screw auger is designed such that the pitch of the blades decreases as one proceeds from the hopper to the die head which arrests the rotary movement imparted to the dough product by the extruder auger and converts it to a linear translational movement toward the die orifice. Although the extruder is a continuous operating process, from time to time a surge of dough exiting from the die head may be encountered. The dough guides also help to control such surges that would tend to cause varying degrees of expansion in the product. Moreover, the particular product being extruded can be changed in mid-stream without shutting down the extruder process. By merely changing the dry contents, the degree of moisture and other additives feeding into the extruder, a switch can be made from extruding a puffed breakfast cereal, for example, to a crisp bread. The dough guides of course can be changed without interrupting the extruder process.

The improved apparatus and process of the present invention is capable of achieving the above-enumerated objects and while preferred embodiments of the present invention have been disclosed, it will be understood that it is not limited thereto but may be otherwise embodied within the scope of the following claims.

We claim:

1. A process for extruding an expansible cooked dough, which process comprises passing the dough through a die head having walls defining an elongate die slot having its long edges disposed substantially vertically, thereby causing the dough to undergo vaporization of water and expansion of steam therein, and hence expansion of the dough, as the dough leaves the die slot, the die slot having two guide surfaces disposed on either side of the die slot and extending substantially vertically and substantially parallel to the length of the die slot, whereby contact between the expanded dough and the two guide surfaces enables uniform escape of water vapor from the two substantially vertical surfaces of the extruded dough, thereby producing a more uniformly textured cellular product.

2. A process according to claim 1 wherein the guide surfaces are provided on two parallel plates disposed one on either side of the die slot.

3. A process according to claim 1 wherein at least one of the guide surfaces is movable.

4. A process according to claim 3 wherein the other guide surface is stationary.

5. A process according to claim 3 wherein at least one of the guide surfaces is movable in a direction perpendicular to the direction of movement of the dough through the die slot.

6. A process according to claim 1 wherein the dough leaving the die slot is rotated through substantially a right angle about an axis parallel to the direction of movement of the dough, thereby disposing the flat piece of dough extruded from the die slot substantially in a horizontal plane.

7. A process according to claim 1 wherein the die head has a plurality of die slots.

* * * * *

UNITED STATES PATENT AND TRADEMARK OFFICE
CERTIFICATE OF CORRECTION

PATENT NO. : 4,698,228

DATED : October 6, 1987

INVENTOR(S) : Robert Straka, et al

It is certified that error appears in the above-identified patent and that said Letters Patent is hereby corrected as shown below:

Title page:

The name of the second inventor, listed as "Edgar Ross" should read --Robert E. Ross--.

Signed and Sealed this

Ninth Day of August, 1988

Attest:

DONALD J. QUIGG

*Attesting Officer*      *Commissioner of Patents and Trademarks*